United States Patent
Chen et al.

(10) Patent No.: US 8,869,499 B2
(45) Date of Patent: Oct. 28, 2014

(54) MOWING MACHINE

(75) Inventors: Tien-Chen Chen, New Taipei (TW);
Wei-Han Chen, New Taipei (TW)

(73) Assignee: Tien-Chen Chen, New Taipei (TW)

( * ) Notice: Subject to any disclaimer, the term of this patent is extended or adjusted under 35 U.S.C. 154(b) by 204 days.

(21) Appl. No.: 13/461,209

(22) Filed: May 1, 2012

(65) Prior Publication Data
US 2012/0279188 A1  Nov. 8, 2012

Related U.S. Application Data

(60) Provisional application No. 61/481,271, filed on May 2, 2011.

(51) Int. Cl.
*A01D 43/06* (2006.01)
*A01D 37/00* (2006.01)

(52) U.S. Cl.
CPC ............... *A01D 43/06* (2013.01); *A01D 37/00* (2013.01)
USPC .................................................. 56/202; 56/1

(58) Field of Classification Search
USPC ............. 15/79.2; 53/370, 390, 523, 527, 528, 53/550; 56/1, 5, 13.3, 16.6, 17.5, 56/202–206; 100/88, 145, 149
See application file for complete search history.

(56) References Cited

U.S. PATENT DOCUMENTS

| | | | | |
|---|---|---|---|---|
| 3,222,853 A * | 12/1965 | Michael | | 56/202 |
| 3,916,608 A * | 11/1975 | Garrison | | 56/202 |
| 4,256,035 A * | 3/1981 | Neufeldt | | 100/145 |
| 4,366,665 A * | 1/1983 | VanGinhoven et al. | | 56/341 |
| 4,409,784 A * | 10/1983 | VanGinhoven et al. | | 56/341 |
| 4,662,151 A * | 5/1987 | Mathes et al. | | 53/587 |
| 6,341,470 B1 * | 1/2002 | Lacey | | 53/176 |
| 8,429,887 B2 * | 4/2013 | Sadler | | 56/202 |

* cited by examiner

*Primary Examiner* — Robert Pezzuto
(74) *Attorney, Agent, or Firm* — Muncy, Geissler, Olds & Lowe, P.C.

(57) ABSTRACT

A mowing machine includes a cutting unit, a conveying unit for conveying grass clippings away from the cutting unit, and a packing unit including a paper-rolling module and a paper-dispensing module. The paper-rolling module defines an accommodation space for collecting grass clippings from the conveying unit, and includes scrolling axles spaced apart from each other by a gap, and movable between an opened position, where the gap has a predetermined width for allowing passage of the grass clippings from the conveying unit through the gap into the accommodation space, and a closed position, where the scrolling axles rotate to pack the grass clippings with the paper dispensed from the paper-dispensing module.

7 Claims, 6 Drawing Sheets

MOWING MACHINE

CROSS-REFERENCE TO RELATED APPLICATION

This application claims priority of U.S. Provisional Patent Application No. 61/481,271, filed on May 2, 2011.

BACKGROUND OF THE INVENTION

1. Field of the Invention

The invention relates to a mowing machine, more particularly to a mowing machine that is capable of packing collected grass clippings into grass packs.

2. Description of the Related Art

There are currently various types of mowing machines. Taiwanese Patent Application No. 095123429 discloses a conventional mowing machine that includes a cutting blade unit and a hybrid power module, so that the cutting blade unit can be driven by either one of a piston engine and a battery of the hybrid power module as required. Taiwanese Patent No. 513277 discloses a conventional mowing machine having a detachable container for accommodating grass clippings. Taiwanese Patent No. I333831 discloses a conventional mowing machine having a mechanism for collecting grass clippings from a cutting unit via an air channel into a bag by suction, and for discharging air from the bag toward the cutting unit through the air channel, thereby suppressing noise generation and preventing leakage of dust.

SUMMARY OF THE INVENTION

The object of the present invention is to provide a mowing machine that is capable of collecting grass clippings and automatically packing the collected grass clippings into grass packs.

Accordingly, a mowing machine of the present invention is capable of packing grass clippings with paper. The mowing machine comprises a cutting unit adapted for cutting grass, a conveying unit adapted for conveying grass clippings away from the cutting unit, and a packing unit including a paper-rolling module and a paper-dispensing module. The paper-rolling module defines an accommodation space for collecting grass clippings from the conveying unit, and includes first and second scrolling axles that are spaced apart from each other by a gap, which is in spatial communication with the accommodation space, and that are movable relative to each other between an opened position, where the gap has a first predetermined width for allowing passage of the grass clippings from the conveying unit through the gap into the accommodation space, and a closed position, where the gap has a second predetermined width smaller than the first predetermined width. The paper-dispensing module is adapted for dispensing paper into the accommodation space via the gap. The first and second scrolling axles rotate to pack the grass clippings with the paper when being at the closed position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
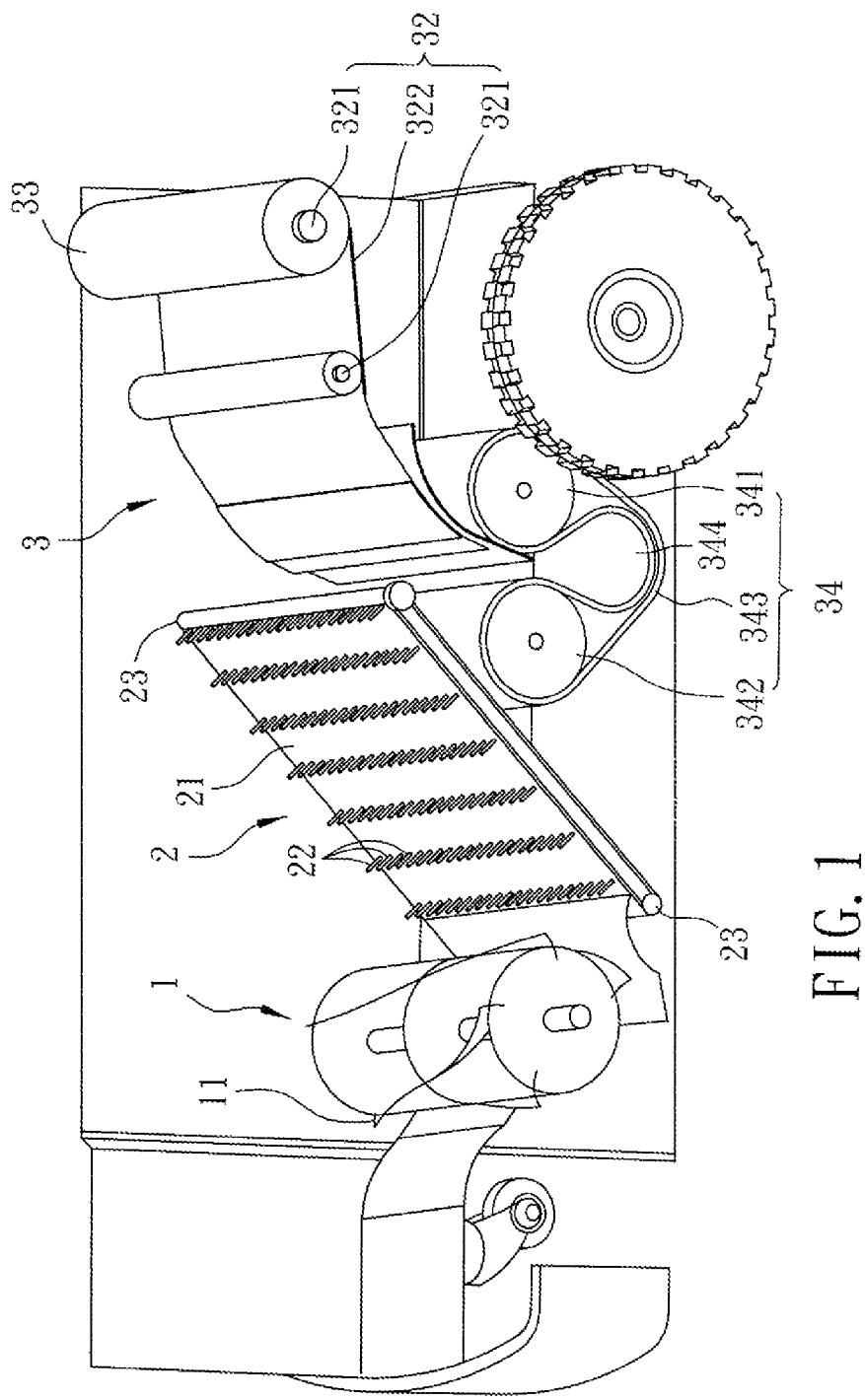
FIG. 1 is a schematic perspective view of a first preferred embodiment of a mowing machine according to the invention.

Before the present invention is described in greater detail, it should be noted that like elements are denoted by the same reference numerals throughout the disclosure.

As shown in FIG. 1, a first preferred embodiment of a mowing machine according to the present invention comprises a cutting unit 1, a conveying unit 2 and a packing unit 3.

The cutting unit 1 includes a rotary blade 11 that is rotatably driven to cut grass and to fling grass clippings onto the conveying unit 2.

The conveying unit 2 is disposed behind the cutting unit 1, and includes a pair of rollers 23, one of which is disposed relatively proximate to the cutting unit 1, and a first belt 21 wound over the rollers 23 and arranged to convey the grass clippings from the cutting unit 1 to the packing unit 3. Said one of the rollers 23 is disposed at a low position relative to the other one of the rollers 23. The conveying unit 2 further includes a plurality of rows of bristles 22 arranged along and disposed on the first belt 21 for holding the grass clippings while the first belt 21 is conveying the grass clippings.

Figure 2:
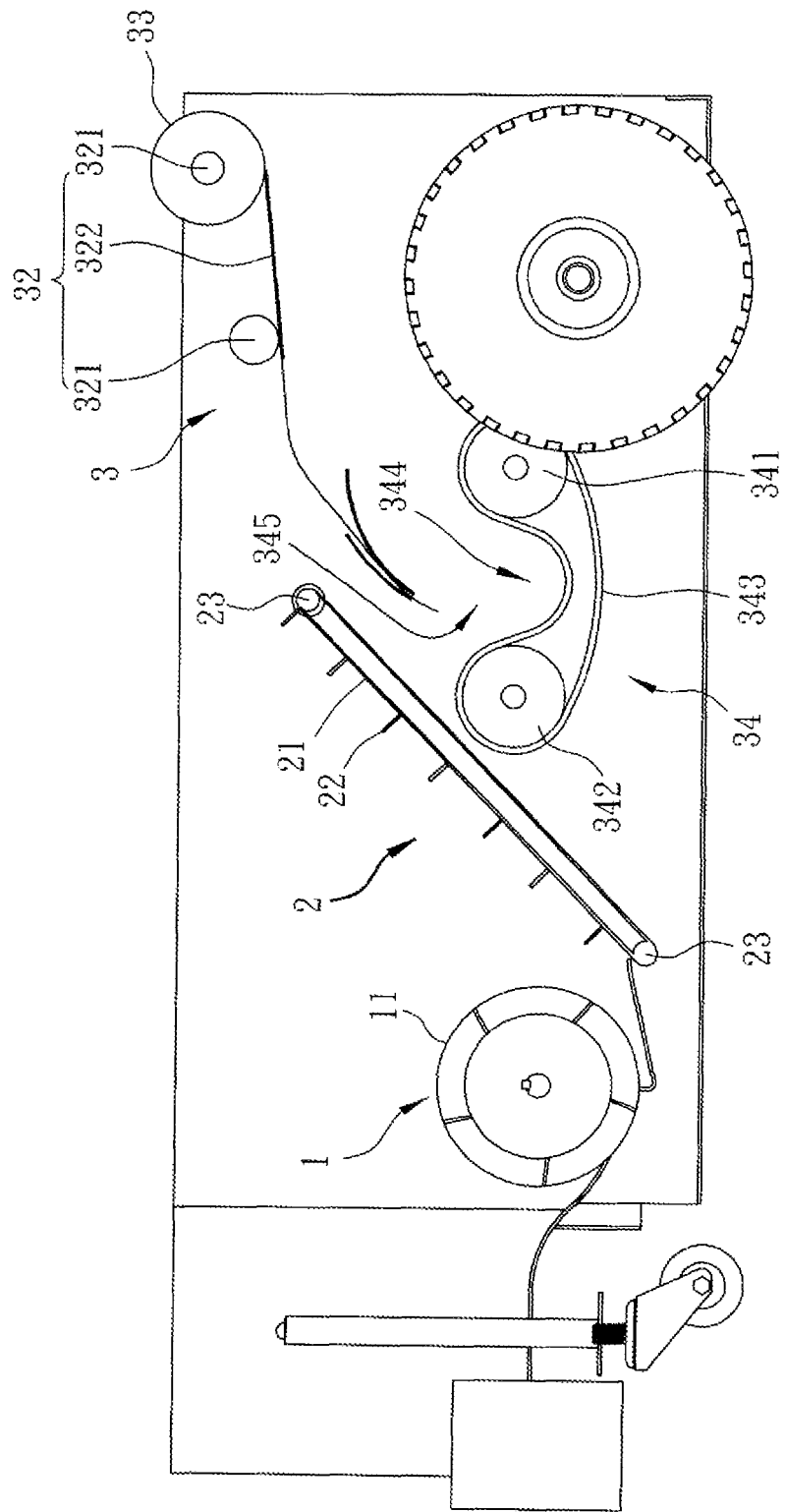
FIG. 2 is a schematic side view of the first preferred embodiment, illustrating first and second scrolling axles at an opened position.
Figure 3:
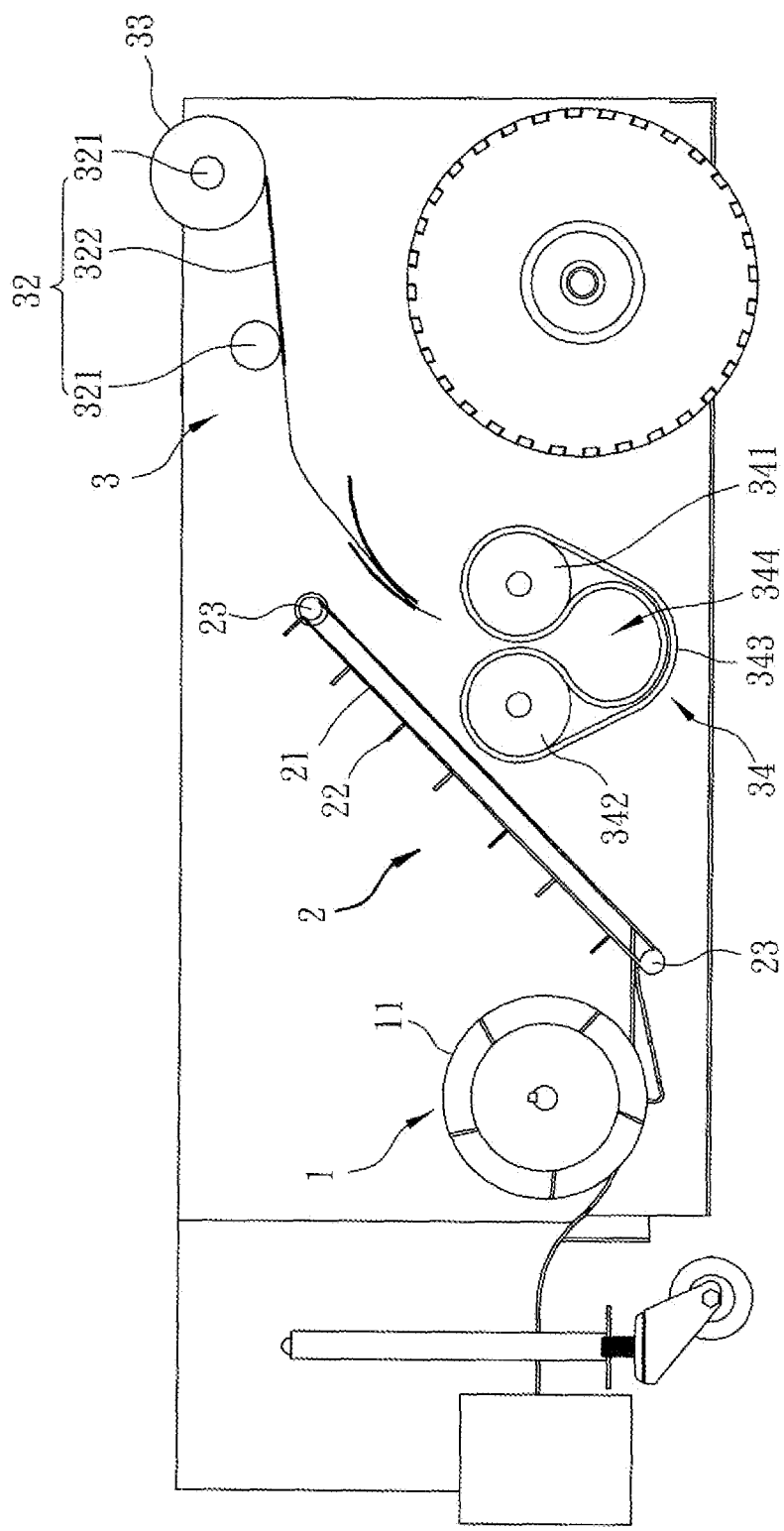
FIG. 3 is a view similar to FIG. 2, but illustrating the first and second scrolling axles at a closed position.

As further shown in FIGS. 2 and 3, the packing unit 3 includes a paper-dispensing module 32 and a paper-rolling module 34. In this embodiment, the paper-dispensing module 32 is disposed behind the conveying unit 2, and includes a pair of paper-dispensing scrolling axles 321 spaced apart from each other, and a paper-guiding bracket 322 disposed adjacent to the paper-conveying scrolling axles 321 and cooperating therewith to dispense paper from a paper roll 33, which, in this embodiment, is sleeved onto one of the paper-dispensing scrolling axles 321.

The paper-rolling module 34 includes first and second scrolling axles 341, 342, and a second belt 343 wound over the first and second scrolling axles 341, 342 and cooperating therewith to define an accommodation space 344 under the other one of the rollers 23 for collecting the grass clippings. The first and second scrolling axles 341, 342 are spaced apart from each other by a gap 345, which is in spatial communication with the accommodation space 344, and are movable relative to each other between an opened position (see FIG. 2), where the gap 345 has a first predetermined width sufficiently large to permit falling of the grass clippings from the first belt 21 through the gap 345 into the accommodation space 344, and a closed position (see FIG. 3), where the gap 345 has a second predetermined width sufficiently smaller than the first predetermined width such that the first and second scrolling axles 341, 342 are able to cooperatively roll the second belt 343 to roll the grass clippings in the accommodation space 344 with the paper dispensed from the paper-dispensing module 32. In this embodiment, the second scrolling axle 342 is fixed and the first scrolling axle 341 is movable.

During operation of the mowing machine of this invention, when the first and second scrolling axles 341, 342 are disposed in the opened position, the grass clippings flung from the rotary blade 11 onto the first belt 21 is conveyed toward the other one of the rollers 23, and subsequently falls off through the gap 345 into the accommodation space 344. The first preferred embodiment is configured such that, upon detecting (e.g., through optical techniques) a predetermined amount of grass clippings in the accommodation space 344, operations of the cutting unit 1 and the conveying unit 2 are paused, the paper is dispensed from the paper-dispensing module 32 under guidance of the paper-guiding bracket 322 into the accommodation space 344 through the gap 345, and the first and second scrolling axles 341, 342 move from the opened position into the closed position to roll the grass clippings in the accommodation space 344 with the paper dispensed from the paper-dispensing module 32 to form a grass pack.

It should be noted that, before operation of the cutting unit 1 takes place, the paper-dispensing module 32 may be configured to dispense paper into the accommodation space 344 such that a portion of the second belt 343 corresponding to the accommodation space 344 is laid with paper.

Figure 4:
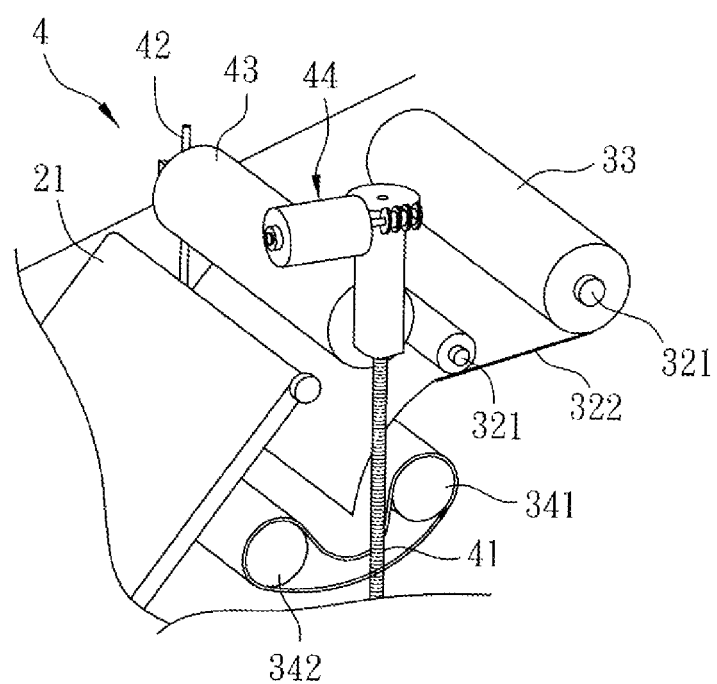
FIG. 4 is a fragmentary schematic perspective view of a second preferred embodiment of the mowing machine according to the invention.

As shown in FIG. 4, the second preferred embodiment of the mowing machine according to the present invention has a structure similar to that of the first preferred embodiment, and further comprises a compacting unit 4 that is operatively associated with the paper-rolling module 34. In particular, the compacting unit 4 includes a transmission pole 41 and a positioning pole 42 disposed respectively at opposite lateral sides of the paper-rolling module 34, a grass-compacting roller 43 disposed to extend between the transmission pole 91 and the positioning pole 42 and connected to the transmission pole 91, and a driving mechanism 44 for driving the grass-compacting roller 43 to move along the transmission pole 41. When the first and second scrolling axles 341, 342 are at the opened position, the grass-compacting roller 43 is operable to move downwardly into the accommodation space 344 through the gap 345 to press against the grass clippings from top so as to force air out of the grass clippings, thereby reducing space occupied by the grass clippings.

Figure 5:
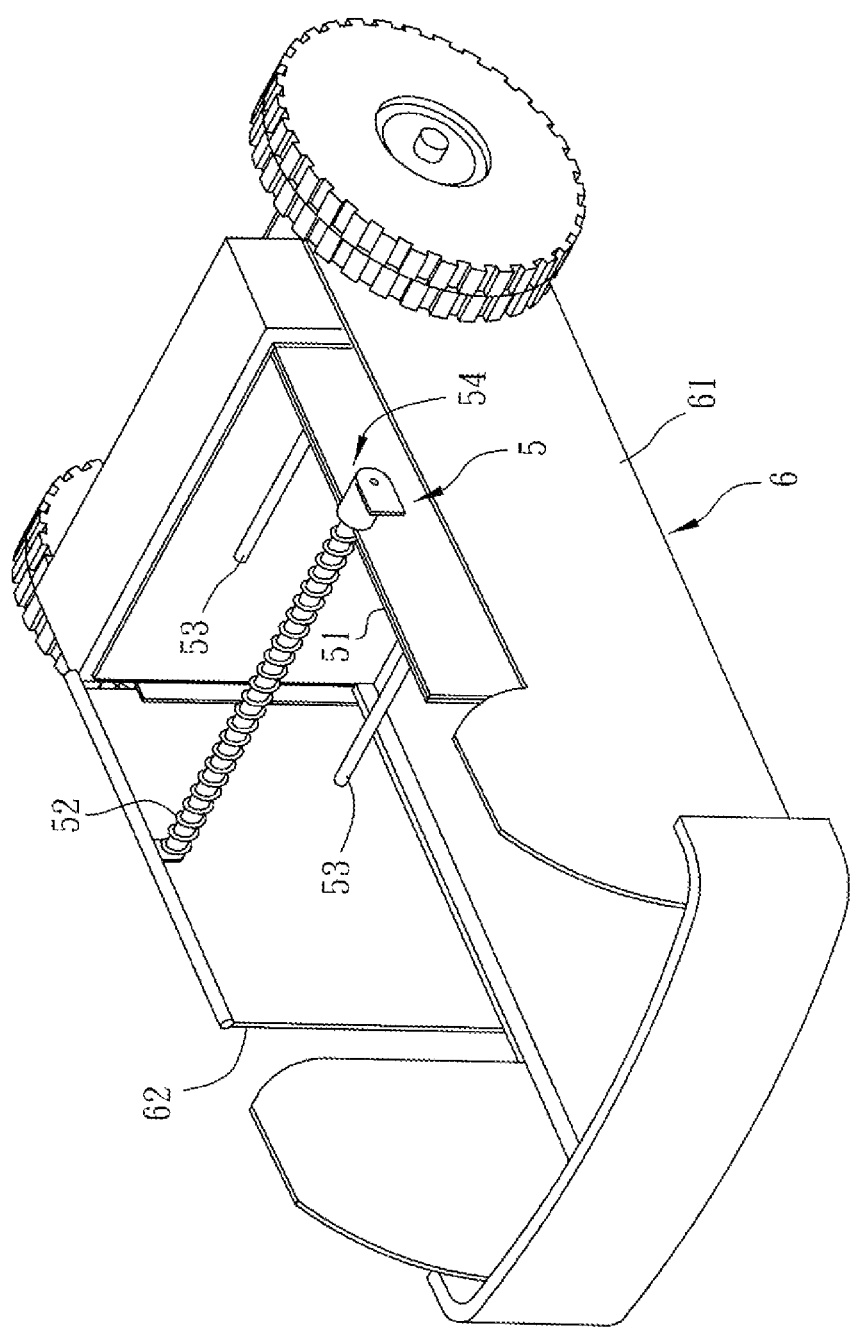
FIG. 5 is a fragmentary schematic perspective view of a third preferred embodiment of the mowing machine according to the invention before operation of a dispensing unit.
Figure 6:
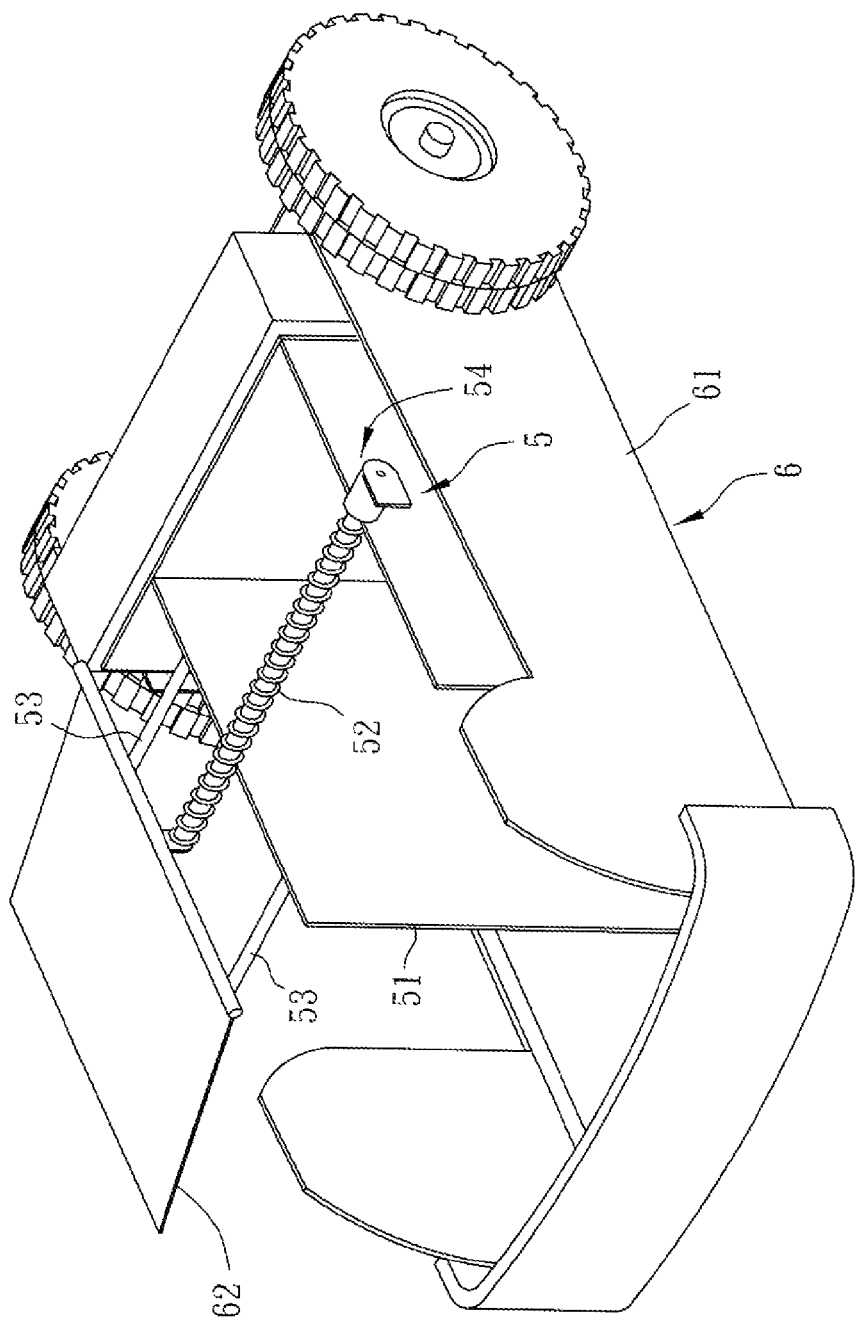
FIG. 6 is a view similar to FIG. 6, but illustrating the third preferred embodiment after operation of the dispensing unit.

As shown in FIGS. 5 and 6, a third preferred embodiment of a mowing machine according to the present invention has a structure similar to that of the first preferred embodiment, and further comprises a dispensing unit 5 and a housing unit 6. The dispensing unit 5 is operatively associated with the paper-rolling module 34, and includes a threaded transmission shaft 52 extending between the lateral sides of the paper-rolling module 34, a pushing plate 51 connected to and drivingly movable along the transmission shaft 52, a plurality of pushing rods 53 extending from a top end of the pushing plate 51 toward the one of the lateral sides of the paper-rolling module 34, and a plate-driving mechanism 54 that is disposed at the other one of the lateral sides of the paper-rolling module 34, that is connected to the threaded transmission shaft 52, and that is operable for driving movement of the pushing plate 51 along the transmission shaft 52.

The housing unit 6 includes a main body 61 mounted with the cutting unit 1, the conveying unit 2, the packing unit 3, and the dispensing unit 5. The housing unit 6 further includes a flap door 62 pivotedly connected to the main body at top, disposed corresponding to the other one of the lateral sides of the paper-rolling module 34, and corresponding in position to the pushing plate 51.

Once the grass clippings in the accommodation space 344 is rolled in the paper, the plate-driving mechanism 54 is operable to drivingly move the pushing plate 51 toward the flap door 62 to push open the flap door 62 with the pushing rods 53 while the pushing plate 51 pushes the roll of grass clippings from the accommodation space 344 toward the flap door 62 and out of the main body 61. Preferably, the flap door 62 is provided with a magnetic component at bottom (not shown) for magnetically closing the flap door 62. After the roll of grass clipping is pushed out of the main body 61, the plate-driving mechanism 54 is operable to drivingly move the pushing plate 51 away from the flap door 62, permitting the flap door 62 to close. Thereafter, operations of the cutting unit 1 and the conveying unit 2 are resumed.

It should be further noted that light sensor techniques may be employed for detecting the amount of the grass clippings in the accommodation space 344. Moreover, adhesives may be applied to marginal portions of the paper roll 33 before use such that opposite ends of the roll of grass clippings are sealed during the rolling process, which prevents leakage of grass clippings.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mowing machine capable of packing grass clippings with paper, said mowing machine comprising:
   a cutting unit adapted for conveying grass;
   a conveying unit adapted for conveying grass clippings away from said cutting unit; and
   a packing unit including
      a paper-rolling module defining an accommodation space for collecting grass clippings from said conveying unit, and including first and second scrolling axles that are spaced apart from each other by a gap, which is in spatial communication with said accommodation space, and that are movable relative to each other between an opened position, where said gap has a first predetermined width for allowing passage of the grass clippings from said conveying unit through said gap into said accommodation space, and a closed position, where said gap has a second predetermined width smaller than the first predetermined width, and
      a paper-dispensing module adapted for dispensing paper into said accommodation space via said gap, said first and second scrolling axles rotating to pack the grass clippings with the paper when being at the closed position.

2. The mowing machine as claimed in claim 1, further comprising a compacting unit adapted to extend into said accommodation space through said gap and compact the grass clippings therein when said first and second scrolling axles are at the opened position.

3. The mowing machine as claimed in claim 2, wherein said mowing machine as claimed in claim 2, wherein disposed at one lateral side of said paper-rolling module and moveable in said accommodation space toward the other lateral side to push the grass pack out of said accommodation space.

4. The mowing machine as claimed in claim 3, further comprising a housing unit that is mounted with said cutting unit, said conveying unit, said grass-packing unit, said compacting unit and said dispensing unit, and that includes a flap door operable to open for permitting the passage of the grass pack therethrough during the grass-dispensing action of said dispensing unit.

5. The mowing machine as claimed in claim 1, wherein said cutting unit includes a rotary blade unit adapted for cutting the grass and fling the grass clippings onto said conveying unit.

6. The mowing machine as claimed in claim 1, wherein said conveying unit includes a pair of rollers spaced apart from each other, a first belt wound over said rollers, and a plurality of bristles provided on said first belt.

7. The mowing machine as claimed in claim 1, wherein said paper-dispensing module of said packing unit includes a pair of paper-conveying scrolling axles spaced apart from each other, and a paper-guiding bracket disposed adjacent to said paper-conveying scrolling axles such that the scrolling paper is conveyed into said paper-rolling module under guidance of said paper-guiding bracket.

\* \* \* \* \*

UNITED STATES PATENT AND TRADEMARK OFFICE
CERTIFICATE OF CORRECTION

PATENT NO. : 8,869,499 B2  
APPLICATION NO. : 13/461209  
DATED : October 28, 2014  
INVENTOR(S) : Tien-Chen Chen Page 1 of 1

It is certified that error appears in the above-identified patent and that said Letters Patent is hereby corrected as shown below:

On the Title Page item (75), please remove the name of the 2nd inventor, "Wei-Han CHEN"

Signed and Sealed this
Twenty-fifth Day of August, 2015

Michelle K. Lee
*Director of the United States Patent and Trademark Office*